N. HILL.
SNOWPLOW.
APPLICATION FILED JAN. 27, 1921.

1,401,256. Patented Dec. 27, 1921.

Inventor
Nels Hill
By A. M. Carlsen.
Attorney

UNITED STATES PATENT OFFICE.

NELS HILL, OF ST. PAUL, MINNESOTA.

SNOWPLOW.

1,401,256.  Specification of Letters Patent.  Patented Dec. 27, 1921.

Application filed January 27, 1921. Serial No. 440,281.

*To all whom it may concern:*

Be it known that I, NELS HILL, a citizen of the United States, residing at St. Paul, in the county of Ramsey and State of Minnesota, have invented a new and useful Snowplow, of which the following is a specification.

My invention relates to snow plows, and the main object is to provide a snow plow that may be propelled in various manners and will work well regardless of whether the wind blows from the one side or the other.

In the accompanying drawing, Figure 1 is a top or plan view of my improved snow plow with the roof of the cab removed. Fig. 2 is a partly sectional side elevation of Fig. 1. In both views the cab doors are omitted from the door openings 19.

Figure 1:
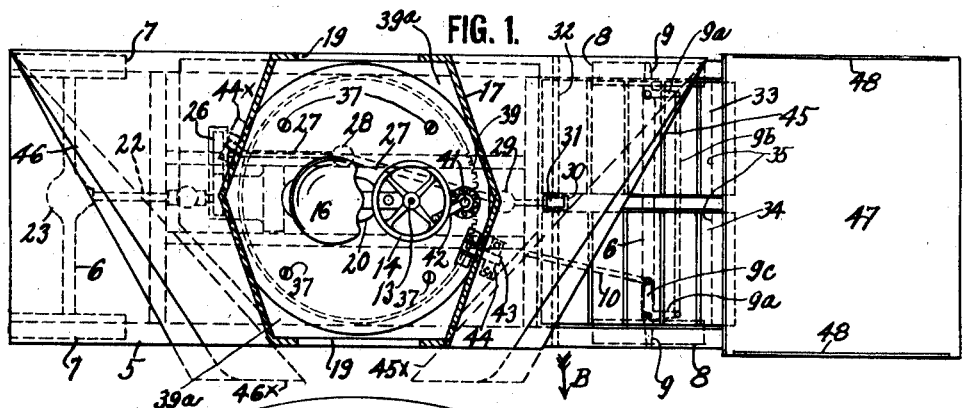

Referring to the drawing by reference numerals, I provide a kind of motor truck composed of a body 5 mounted on axles 6 having driving wheels 7 and two front steering wheels 8 having stub axles 9, both of said stub axles being of the regular automobile type for steering, having the forwardly projecting arms 9$^a$ connected by a link 9$^b$ and one of them having the inwardly projecting steering arm 9$^c$ operated by a drag link 10, rocker arm 11 and shaft 12, the latter being operatively connected to a steering column 13 having a hand wheel 14 operated by a driver 15, who sits on a seat 16 in a cab 17 having windows 18 and one or more door openings 19 with doors (not shown).

The car is propelled by an engine 20 which projects partly below the flat main frame 5 and has its shaft 21 suitably connected with the torsion shaft 22 of the usual differential gearing in the housing 23, by a suitable transmission 24$^x$ in the housing 24. 25 is the fly wheel housing of the engine.

Driven by one of the transmission gears is a comparatively large gear 26, having a shaft 27, composed of sections connected by universal joints 28, 29 and having its forward end formed as a worm-screw 30, which screw rotates a worm gear 31 fixed on a shaft 32. This shaft carries sprockets 32$^a$ operating two endless conveyers 33 and 34 which are stretched over said driven sprockets and over idle front rollers 35.

About central on the truck platform or flat frame 5 is secured by bolts 37 a round embossment 36 having its outer edge undercut to form a recess 38 in which rotates the internally toothed circular edge 39 of the rest of the floor, 39$^a$ of the cab 17. Said curved rack 39 is engaged by a gear pinion 40 fixed on an upright shaft 41 rotating in a hollow post 41$^x$ and having a crank 42 by which the driver may rotate the cab about the circular part of the floor. Said circular part carries a pivoted latch 43 arranged to engage alternately in either one of two notched blocks 44 and 44$^x$ fixed on the rotary portion of the cab floor according to which end of the cab is to point forward during the operation of the plow.

It will namely be observed that the cab is formed with two reversely beveled end or body portions which form two diagonally disposed grooved deflectors 45, 46 either of which may be turned forward to receive and guide sidewise the snow plowed up by a shovel-shaped scoop 47 having side guards 48 and being supported by a frame extension 49 having braces 50 supporting it. The deflectors 45, 46 may have lateral extensions 45$^x$, 46$^x$ to force the snow sufficiently away from the side of the machine so it can in no event get back into the plowed road in front of the rear wheels.

Figure 2:
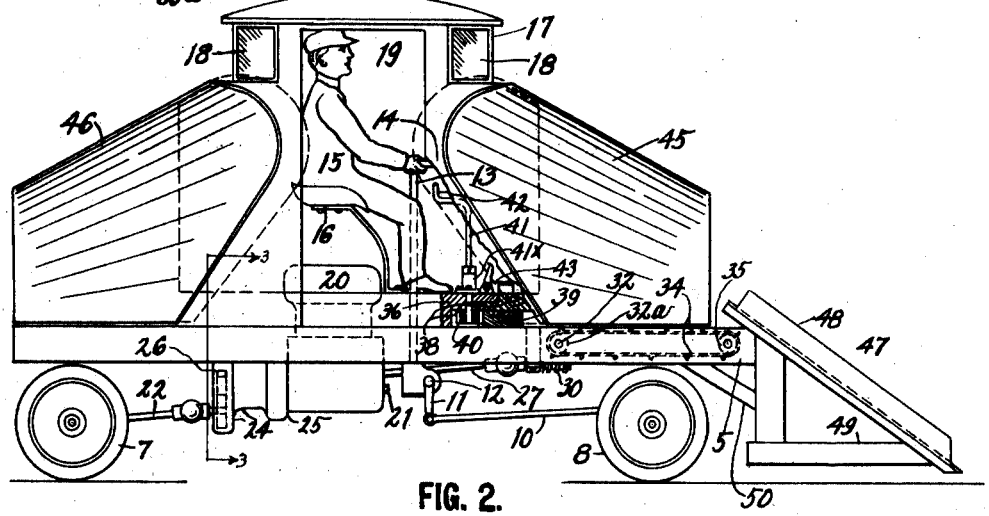
Figure 3:
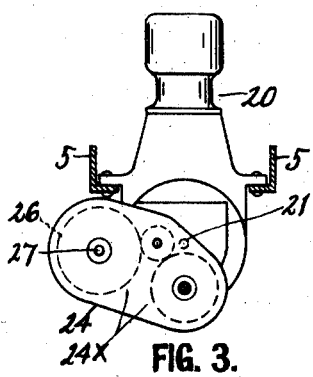
Fig. 3 is an enlarged section on the line 3—3 in Fig. 2.
Figure 4:
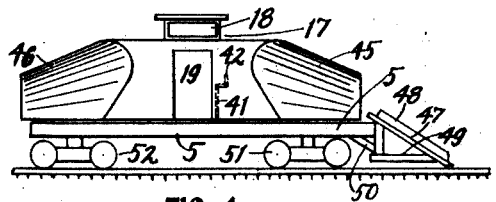
Fig. 4 is a side elevation showing the plow as mounted on a flat car or other truck adapted to be pushed by a locomotive or other engine, instead of having the structure provided with its own motive power, as in the Figs. 1 and 2.

In the modification shown in Fig. 4 the arrangement is the same as in Figs. 1 and 2 as far as the parts are concerned having the same numerals as in Figs. 1 and 2, but no independent engine is employed, the frame 5 being either provided with supporting wheels 51, 52 or it may be placed and secured upon a railway car of the flat-car type. In either case the machine is then propelled forward by a railroad engine or other motor car.

In the operation of the machine it is run at a good speed, so that the shovel 47 scoops the snow up and as the snow is pushed rearwardly by the snow in front of it, it is deflected laterally over on the ground by the forward deflector and often by wind blowing in the direction of the arrow B in Fig. 1. If the wind blows in the reverse direction the cab is turned with the deflector 46 forward, and thus the wind from either side may be utilized to aid in the operation. And during the operation the endless carriers 33, 34 serve to prevent clogging of snow intermediate the scoop and the forward deflector.

What I claim is:

1. A snow plow comprising a flat main frame with a flat snow scoop at its front end, a body mounted upon the main frame to rotate in a horizontal plane and having two reversely arranged, grooved snow deflecting boards one at each end of it, and means for turning and means for holding said body with either deflector in a forward direction so as to deflect laterally the snow taken up by the scoop, and means for supporting and for propelling forward the said main frame.

2. The structure specified in claim 1, and endless conveyers at the junction of the scoop and the forward deflector to prevent clogging of snow at said point, said conveyers having operative connection with the propelling means.

3. The structure specified in claim 1, said rotatable body forming a cab with windows for an operator in the cab to see through and the means for rotating and for holding rotated said body being located within the cab.

4. The structure specified in claim 1, said supporting means and propelling means comprising supporting wheels on the main frame and an engine carried by the frame, and operative connection between the engine and the supporting wheels.

5. The structure specified in claim 1, said rotatable body forming a cab with non rotatable floor fixed on the main frame, and the supporting means of the main frame comprising rear driving wheels and front steering wheels, and means extending upward into the cab for steering the front wheel.

6. The structure specified in claim 5, said propelling means comprising an engine accessible within the cab and operatively connected with the rear supporting wheels.

7. The structure specified in claim 6, and endless conveyers in the space between the scoop and the deflecting body, said conveyers having operative connection with the engine.

In testimony whereof I affix my signature.

NELS HILL.